US011857103B2

(12) United States Patent
De'Longhi et al.

(10) Patent No.: US 11,857,103 B2
(45) Date of Patent: Jan. 2, 2024

(54) MACHINE AND METHOD FOR PREPARING BEVERAGES (71) Applicant: DE' LONGHI APPLIANCES S.R.L. CON UNICO SOCIO, Treviso (IT)

(72) Inventors: Giuseppe De'Longhi, Treviso (IT); Gianpaolo Trevisan, San Martino Buon Albergo (IT); Renzo Mazzon, Silea (IT)

(73) Assignee: DE' LONGHI APPLIANCES S.R.L. CON UNICO SOCIO, Treviso (IT)

(*) Notice: Subject to any disclaimer, the term of this patent is extended or adjusted under 35 U.S.C. 154(b) by 800 days.

(21) Appl. No.: 16/766,697

(22) PCT Filed: Nov. 23, 2018

(86) PCT No.: PCT/IT2018/050230
§ 371 (c)(1),
(2) Date: May 24, 2020

(87) PCT Pub. No.: WO2019/102514
PCT Pub. Date: May 31, 2019

(65) Prior Publication Data
US 2020/0288901 A1    Sep. 17, 2020

(30) Foreign Application Priority Data
Nov. 23, 2017  (IT) .................. 102017000134800

(51) Int. Cl.
*A47J 31/52*      (2006.01)
*A47J 31/00*      (2006.01)
(Continued)

(52) U.S. Cl.
CPC ............. *A47J 31/057* (2013.01); *A23F 5/262* (2013.01); *A47J 31/002* (2013.01);
(Continued)

(58) Field of Classification Search
CPC .. A47J 31/002; A47J 31/5255; A47J 31/5253; A47J 31/5251; A47J 31/525; A23F 5/262; A23F 5/26
See application file for complete search history.

(56) References Cited

U.S. PATENT DOCUMENTS

2006/0096465 A1    5/2006  Hu et al.
2011/0315711 A1*  12/2011  Hecht .................. B67D 1/0895
                                                          222/144.5
(Continued)

FOREIGN PATENT DOCUMENTS

EP    0771542 A1    5/1997
EP    2353469 A1    8/2011
(Continued)

OTHER PUBLICATIONS

International Search Report and Written Opinion for PCT/IT2018/050230, dated Apr. 12, 2019.

Primary Examiner — Reginald Alexander
(74) Attorney, Agent, or Firm — MARSHALL, GERSTEIN & BORUN LLP (57) ABSTRACT A method to prepare a beverage in a machine for preparing beverages, including: receiving through a user interface associated with a control and command unit the selection of a type of beverage to be prepared selected between a beverage obtained by infusion, or hot water; disenabling the commands of said user interface not related to the type of beverage selected, and enabling the commands correlated to the type of beverage selected, in order to allow the selection by the user of further specific organoleptic characteristics for the type of beverage selected; receiving and verifying the characteristics selected and conditioning the various functioning factors of said machine in relation to the specific (Continued)

selected characteristics and the operating parameters provided for the specific selected beverage.

20 Claims, 4 Drawing Sheets (51) Int. Cl.
    *A47J 31/057*     (2006.01)
    *A47J 31/06*     (2006.01)
    *A23F 5/26*     (2006.01)

(52) U.S. Cl.
    CPC ....... *A47J 31/0652* (2013.01); *A47J 31/5251* (2018.08); *A47J 31/5253* (2018.08); *A47J 31/5255* (2018.08); *A23F 5/26* (2013.01); *A47J 31/525* (2018.08)

(56) References Cited

U.S. PATENT DOCUMENTS

| | | |
|---|---|---|
| 2017/0086473 A1 | 3/2017 | Ingold |
| 2017/0135514 A1* | 5/2017 | Caputa ................. A47J 31/446 |

FOREIGN PATENT DOCUMENTS

| | | |
|---|---|---|
| WO | WO-2005/094644 A1 | 10/2005 |
| WO | WO-2009/016490 A2 | 2/2009 |
| WO | WO-2014/032110 A1 | 3/2014 |
| WO | WO-2016/034255 A1 | 3/2016 |

\* cited by examiner

MACHINE AND METHOD FOR PREPARING BEVERAGES

FIELD OF THE INVENTION

The present invention concerns a machine, either automatic or semiautomatic, suitable for preparing beverages, hot or cold, such as coffee, tea, various infusions, or even just water, and a method for preparing the beverage.

BACKGROUND OF THE INVENTION

Machines that produce American-style coffee are known, that is, those long coffees also called "drip coffee", obtained by infusing a quantity of coffee powder with hot water.

The Applicant set himself the problem of improving these machines, making them suitable to provide a wide range of beverages, whether cold, or, advantageously, hot.

It is known that current machines have a tank for the water, a device for heating the water, a container suitable for positioning a filtering element for the coffee powder, or other aromatic mixture, which is passed through by the hot water, and a receptacle, for example a jug, normally suitable to contain a maximum volume sufficient to fill a certain number of cups for the end users.

The jug is normally associated with its own heating means to keep the coffee beverage dispensed in the jug hot.

The heating device is generally put in co-operation with the tank, or put downstream of the tank, for example along a pipe that connects an exit of the tank to the filtering container.

When the heating device is activated, the heated water is made to flow from the tank to the filtering container in a known manner, either by convective motion, or by means of a pumping element.

The mixture can be introduced manually or automatically into the filtering element. Means for containing the powdered mixture, and/or metering means and automatic loading means can be present.

It is also known that such machines are generally structured and organized to provide the filtering container with the quantity of hot water useful and/or necessary, or to empty the tank.

These machines have a number of limitations and/or disadvantages.

A first disadvantage is that they dispense a fixed quantity of brewed beverage, and are not able to dispense accurate partial quantities with respect to the size of the jug and/or tank.

To partly solve such problems, machines are known that dispense beverages of the "drip coffee" type, which provide the possibility of selecting the quantity of brewed beverage, and also the degree of infusion of the same.

For example, machines are known that provide to control the quantity of water to be dispensed by regulating the operation of the heating mean. Such solutions, however, do not allow accurate control of the quantity of water to be dispensed in relation to the selection made by the user, since convective motion is generally unreliable.

Machines are also known that provide to control the quantity of water to be dispensed by a pump. These solutions too, however, do not guarantee to dispense the specific quantity of water for each beverage preparation, since the pump alone can not guarantee a correct control These machines provide to use level sensors disposed in the tank to control the water dispensed, but they do not allow a precise control.

Known solutions also provide to control the intensity of the beverage dispensed by performing a pre-infusion step and regulating the quantity of water and/or the pre-infusion time on each occasion.

Providing a pre-infusion step, however, entails an increase in the time required for dispensing the brewed beverage, which can therefore exceed the time normally set as a requirement by the "high quality" certification parameters.

Moreover, the period of time needed for pre-infusion, during which there is a pause in the delivery of the water, entails a decrease in the heat of the water delivered which influences the qualities of taste of the brewed beverage prepared.

Another disadvantage is that they are generally structured to dispense only coffee-based brewed beverages, so that they are not structured to dispense tea-based brewed beverages or other plant substances, or not.

In fact, known solutions do not allow to precisely modify the temperature of the water fed at exit, in order to adapt it to aromatic mixtures of different types.

It is indeed known that in order to prepare beverages based on tea or other vegetable substances, or other, different infusion temperatures than those required for coffee are generally required. Furthermore, different types of substances require different infusion times and temperatures.

These known machines, moreover, are not suitable for dispensing only hot water. If a user wishes to obtain only hot water, he can avoid filling the filtering container with the aromatic mixture; however, the hot water in any case passes through the filtering container, and therefore it can also marginally absorb the aromas, or other, retained inside it, remaining contaminated.

Machines for preparing a brewed beverage are known, which provide to divert a portion of the heated water so that it does not transit through the powdered mixture but is delivered directly into the receptacle that receives the beverage. This solution is implemented in part to reduce the dispensing time of the brewed beverage, and in part to dilute the intensity of the taste that otherwise could be excessive.

However, in the known machines as above, it is provided that a portion of the stream of heated water in any case passes through the filtering container, with the problems described above.

From WO-A-2016/034255 an apparatus and a method for preparing beverages are known, in particular espresso type coffee or "cappuccino"; the apparatus comprises a brewing chamber, at least a pump for supplying water from a tank to the brewing chamber, two heating elements to heat the water, and a controller to independently activate the heating elements. This solution, however, does not allow a user to specifically select the desired organoleptic characteristics for a determinate type of beverage to be prepared.

Document WO-A-2014/032110 discloses a machine for preparing espresso type coffee, which is constructed and programmed to have a secondary water system which can supply water in conjunction with the machine brewing mechanism to produce automatically an Americano-type coffee beverage.

EP-A-0 771 542 discloses a machine for preparing coffee comprising a water tank, a pump, a heat exchanger, a plurality of temperature sensors and a control device programmed to instantly control the operation of the pump as a function of the temperature of the water exiting the heat exchanger.

The aforementioned documents refer in particular to machines for preparing espresso type coffee which generally require to maintain a stable temperature around a given reference value, and possibly to modify the flow rate of the water to compensate for deviations of the water temperature with respect to the predefined reference value.

The machines known in the art, moreover, do not allow to effectively regulate the intensity of the taste of a selected beverage, without the need to modify the quantity of water or the type of coffee used.

The Applicant has thus set himself the purpose of extending the function and functionality of this type of machine, avoiding the disadvantages identified above, and others.

It is a first purpose to dispense different types and/or different quantities of beverage as requested by the user.

Another purpose of the present invention is to provide a machine able to regulate the temperature of the water delivered according to the type of aromatic mixture used and the user's selection.

Another purpose of the present invention is to provide a machine able to dynamically regulate the temperature of the water delivered according to the user's selection.

Another purpose of the present invention is to provide a machine able to regulate the temperature of the water delivered according to the organoleptic characteristics required in the selected beverage.

Another purpose of the present invention is to optimize the efficiency of the water heating.

Another purpose is to dispense the hot water with the precise temperature selected by a user.

Another purpose is to dispense the brewed beverage with the desired degree of intensity and desired concentration of the specific essence.

It is another purpose to facilitate and simplify the use of this machine by the user.

The Applicant has devised, tested and embodied the present invention to overcome the shortcomings of the state of the art and to obtain these and other purposes and advantages.

SUMMARY OF THE INVENTION

The present invention is set forth and characterized in the independent claims, while the dependent claims describe other characteristics of the invention or variants to the main inventive idea.

In accordance with the above purposes, embodiments described here concern a machine for preparing a beverage which allows to dispense, on each occasion, the necessary quantity of water, or also the necessary quantity of water, in relation to the beverage required by a user.

The machine according to the invention also allows to optimize, on each occasion, the temperature, or also the temperature, of the heated water according to the beverage required.

The machine according to the invention provides, in particular, that a user can choose, by means of a user interface, a particular type of beverage, qualifying the characteristics thereof, for example a beverage with precise organoleptic characteristics.

According to some embodiments, the machine comprises selection means, with which a user can select the type of beverage, that is a brewed beverage, or hot water, as well as organoleptic characteristics thereof.

According to some embodiments, the machine comprises a first outlet for the brewed beverage, cooperating with the filtering container, and a second outlet for the hot water, cooperating with an autonomous diversion channel, wherein the first outlet and the second outlet are selectively and alternatively put in fluidic communication with the tank by a diversion element.

According to some embodiments, the machine comprises a selector device by means of which the user can select the type of beverage.

According to other forms of embodiment, the selector device and the diversion element are reciprocally governed in a selective manner.

According to some embodiments, the user can select the quantity of beverage to be dispensed, choosing the size of the receptacle to be used, for example a jug, a cup, a mug a glass or a different sized receptacle.

According to a variant, the machine has means to control the maximum amount of water to be delivered, depending on the size of the receptacle used.

According to some embodiments the user can select the concentration of the brewed beverage, for example light, normal, or strong, or other, or the concentration of total dissolved solids.

According to other embodiments the user can select the delivery temperature of the beverage requested.

The machine comprises a water tank, of a known type, which can be filled on each occasion, periodically or continuously or alternatively, or in addition it can provide access to a continuous source.

Possible means to indicate the volume of water can be present in the tank, possibly associated with signaling means and/or controlled delivery means of water into the tank in order to warn if there is sufficient water or not.

According to a variant, means to indicate to the user the amount of water available are provided.

The tank is put in fluidic communication, by means of at least one circuit, with a filtering container suitable to contain the aromatic mixture to be subjected to infusion to obtain the desired brewed beverage.

According to some embodiments, the filtering container can be standard, that is, suitable to contain a desired quantity of aromatic mixture on each occasion.

According to some embodiments, the machine comprises a pump suitable to pick up the water from the tank and supply it to the filtering container.

According to another variant, the pump has an adjustable and controllable flow rate.

According to other embodiments, along the path of the fluid there is a flowmeter suitable to control the amount of water supplied.

Along the path of the water there is also a heating device of the water passing through.

According to some embodiments, the heating device comprises a boiler disposed along the pipe for the fluid, though which the water fed from the pump transits.

The boiler comprises at least a transit channel associated with at least a heating element disposed along its longitudinal extension.

Downstream of the heating device sensor means to control the temperature are advantageously provided.

The temperature sensor means guarantee that the water passing through as far as the outlet has the desired temperature.

According to some embodiments, the machine according to the invention comprises a control and command unit configured to receive information at least from the temperature sensor means and from the flowmeter, and to regulate the functioning of the heating device and the pump in order to regulate the temperature and the flow rate of the water delivered as a function of the selection made by the user.

In particular, the machine according to the invention on the one hand allow the user to select type, quantity and taste intensity of a beverage, or possibly also the temperature thereof, and on the other hand to regulate the intensity of the taste of the beverage selected according to what indicated by the user acting on the temperature and the flow rate of the water.

In other words, unlike what happens with the machines mainly intended to prepare espresso coffee, in which in order to change the intensity of the taste of a beverage it is necessary to change the type or quantity of aromatic mixture and/or the amount of water that is delivered through the aromatic mixture itself, the machine according to the invention provides to appropriately regulate the temperature and/or the flow rate of the water which passes through the aromatic mixture in order to obtain the desired taste and intensity on each occasion selected by the user.

According to some embodiments, the control and command unit interacts with the user interface and with the selector device to receive a command corresponding to the beverage selected by the user.

According to a variant, the machine has a memory unit in which are installed, or can be installed, tables in which there are standard parameters, or even limit parameters, concerning the various types and concentrations of beverages which can be selected.

According to another variant, the control and command unit, before authorizing the preparation of the beverage on the basis of the instructions given by the user, controls that the instructions are correct and correspond at least to the limits connected with the specific beverage.

Embodiments described here concern a method to prepare a beverage, wherein the method comprises at least:
  receiving through a user interface associated with a control and command unit the selection of a type of beverage to be prepared selected between a beverage obtained by infusion, or hot water;
  based on the type of beverage selected by the user, disenabling the commands of a user interface not related to the type of beverage selected, or enabling the commands connected with the type of beverage selected, in order to allow and simplify the selection by the user of further specific organoleptic characteristics for said type of beverage selected;
  receiving and verifying the characteristics selected by the user as a function of the type of beverage selected, comprising at least one of either quantity, temperature, concentration, infusion times and/or particular functions;
  conditioning the various functioning factors in relation to the specific characteristics of the specific beverage selected and the operating parameters provided for said beverage selected;
  regulating the operation of a pump and a heating device to regulate the temperature and the flow rate of the water to be delivered according to the operating parameters provided for obtaining said selected beverage with the specific organoleptic characteristics selected.

According to a variant, the method provides to verify the functional correctness of the data introduced by the user before starting the preparation of the beverage on the basis of said data.

If the data are off target, the machine, according to a variant, returns them to the nearest or most suitable target value.

The characteristics of the beverage can comprise, for example, organoleptic characteristics, such as quantity, concentration of the solid substances dissolved, temperature, time or the type of infusion or other.

According to some embodiments, on the basis of the type of beverage selected, the method provides to modify the state of a diversion element to make the water pass through a filtering container inside which an aromatic mixture is positioned, or through a diversion channel.

According to a variant, the method also provides to activate the selective dispensing means associated with the outlets.

According to other embodiments, if a brewed beverage is selected, the verification of the characteristics selected by the user provides to verify if the user has selected a concentration for the brewed beverage, or if he has selected a dispensing function on ice.

According to these embodiments, if the dispensing function on ice has been selected, the method provides to wait for a selection of a concentration by the user before preparing the selected beverage.

According to other embodiments, if hot water has been selected, the verification of the characteristics selected by the user provides to verify the heating temperature of the water, and possibly wait for a command to confirm or modify the temperature, by the user.

BRIEF DESCRIPTION OF THE DRAWINGS

These and other characteristics of the present invention will become apparent from the following description of some embodiments, given as a non-restrictive example with reference to the attached drawings wherein.

To facilitate comprehension, the same reference numbers have been used, where possible, to identify identical common elements in the drawings. It is understood that elements and characteristics of one embodiment can conveniently be incorporated into other embodiments without further clarifications.

DETAILED DESCRIPTION OF SOME EMBODIMENTS

Figure 1:
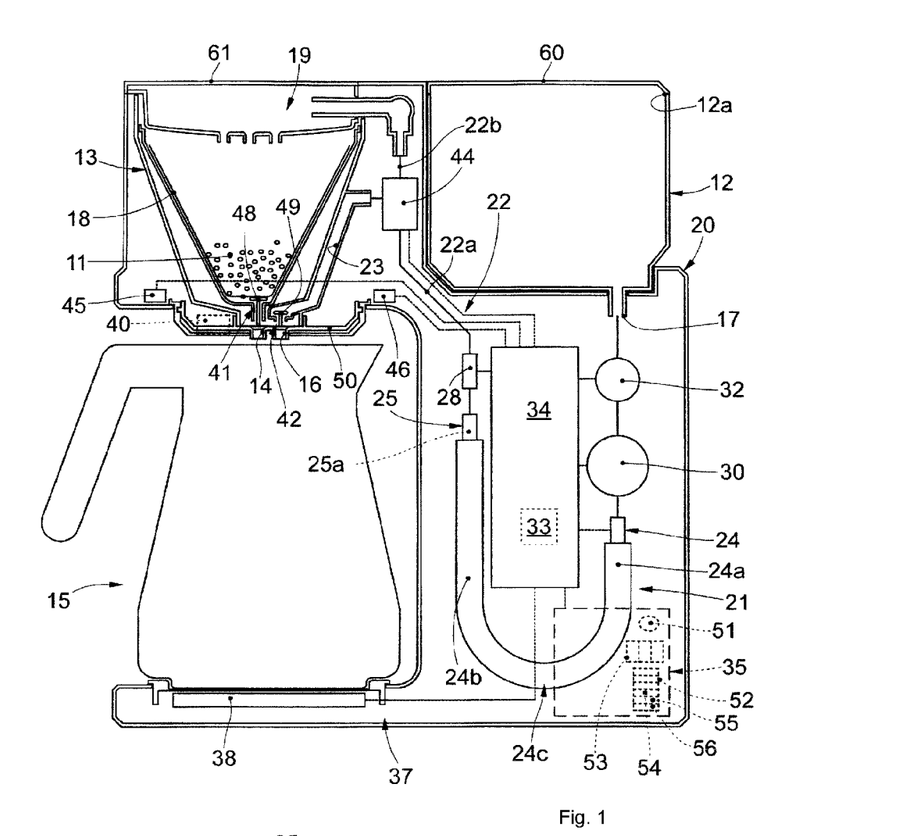
FIG. 1 is a schematic view of a machine for preparing beverages according to embodiments described here.

Embodiments described here with reference to FIG. 1 concern a machine 10 for preparing a hot or cold beverage according to a selection made by a user.

According to some embodiments, the machine 10 according to the invention allows a user to select a type of beverage to be prepared and the respective organoleptic and quantity characteristics of the beverage.

Figure 3:
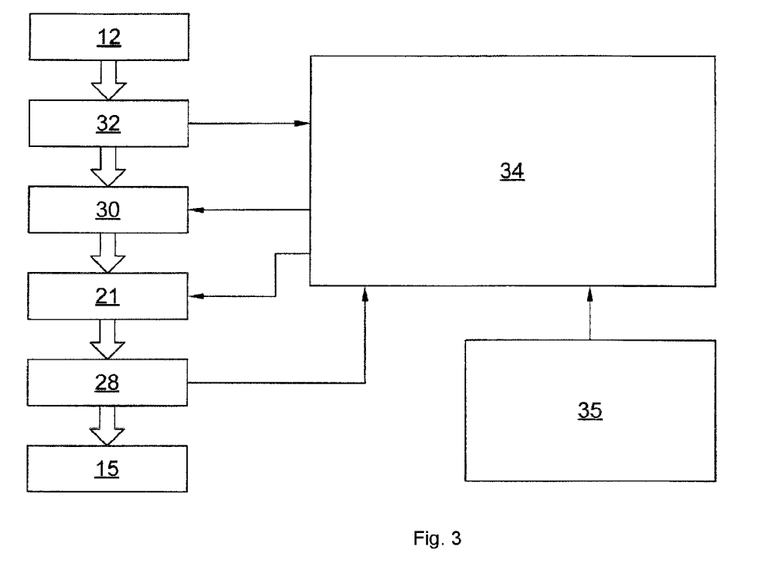
FIG. 3 is a schematic view of the control system of the machine for preparing beverages according to embodiments described here.

According to some embodiments, the machine 10 comprises a user interface 35 provided with suitable commands 51-56, for example, push buttons, selection knobs, and/or a touch screen, by means of which the user can select the characteristics of the beverage to be prepared.

According to some embodiments, the selection of a beverage comprises the selection of the type of beverage and one or more characteristics including quantity, concentration, temperature.

According to some embodiments, the user interface 35 can comprise commands to select the quantity 51 of beverage to be dispensed, and/or the size of a receptacle 15 to be used, for example a jug, a half jug, a cup, a mug, a glass, or suchlike.

Furthermore, the user interface 35 can comprise commands to select the concentration 53 of the brewed beverage, for example light, normal, or strong, or other values, or the concentration of total dissolved solids.

According to a variant, the user interface 35 also comprises commands to select the temperature 52, said commands, according to another variant, can also affect the delivery of the water itself.

According to other embodiments, the user interface 35 can comprise other commands for the functions of dispensing particular types of infusion 54-56.

According to some embodiments, the machine 10 comprises a selector device 40 drivable by a user to select a type of beverage selected between a brewed beverage or hot water.

According to a variant, the selector device 40 is integrated in the user interface 35.

The machine 10 comprises a tank 12 for the water, fluidly connected to a filtering container 13 suitable to contain an aromatic mixture 11 to be infused to obtain the brewed beverage.

For example, the aromatic mixture 11 can be a powdered mixture and/or with a desired grain size, in leaves, or portions thereof, of coffee, tea, or other vegetable substance, or other.

According to some embodiments, the machine 10 comprises a first outlet 14 cooperating with the filtering container 13 through which the brewed beverage can be delivered into the receptacle 15.

According to some embodiments, the machine 10 comprises a second outlet 16 for hot water, through which the hot water can be dispensed into the receptacle 15 without passing through the filtering container 13.

According to possible solutions, the first outlet 14 and the second outlet 16 are advantageously disposed adjacent to each other, so as to allow to dispense the brewed beverage, or hot water, in the same zone, facilitating positioning of the receptacle 15 by the user. For example, the first 14 and the second outlet 16 can be made in a flange 50 that closes the housing 20, located below the filtering container 13.

According to some embodiments, the first outlet 14 and the second outlet 16 are associated with respective selective dispensing means 41, 42, configured to open and/or close the outlets 14, 16 or possibly also to regulate the flow through them.

According to some embodiments, the selective dispensing means 41, 42 can comprise one or more valves 48, 49.

According to a variant, both the first outlet 14 and the second outlet 16 are fluidly connected to the tank 12 by at least one circuit 22, 23.

According to some embodiments, the first outlet 14 and the second outlet 16 partly share at least one segment of the same circuit 22.

According to other embodiments, the second outlet 16 is put in fluid communication with the circuit 22 by means of a diversion channel 23, separated from the filtering container 13.

According to some embodiments, the diversion channel 23 can be made in a peripheral portion of the filtering container 13, separated from the compartment where the aromatic mixture 11 is positioned.

According to other embodiments, the diversion channel 23 can be an independent channel.

The tank 12 can generally be a container configured to contain a certain quantity of water to prepare a beverage. For example, the volume of the tank 12 can be equal to at least the volume of water needed to fill a jug.

The tank 12 can be provided with an introduction aperture 12a, associated with a lid 60, through which water can be introduced into it, and an outlet aperture 17 from which the desired quantity of water can be taken on each occasion.

According to some embodiments, the tank 12 can be positioned inside a housing 20 of the machine 10, or attached thereto, possibly removably, to be subjected to cleaning and/or for filling.

According to some embodiments, the filtering container 13 for the mixture can have a funnel shape, and a filtering element 18 can be inserted therein, suitable to retain the solids of the aromatic mixture 11, preventing them from being dispensed together with the brewed beverage.

According to a variant, means are provided to control the presence of the filtering element 18.

According to another variant, if the filtering element 18 is absent, said means block the functioning of the machine 10, possibly emitting a specific signal.

According to some embodiments, access means 61 and/or movement means can be provided, configured to allow access to the filtering container 13 in order to introduce on each occasion a desired quantity of aromatic mixture 11 and/or remove it together with the possible filtering element 18 at the end of dispensing of the beverage prepared.

According to some embodiments, the machine 10 comprises a diffusion head 19, disposed above the filtering container 13 and configured to dispense the water arriving from the tank 12 above the aromatic mixture 11 so as to distribute the water on the aromatic mixture 11.

According to some embodiments, the diffusion head 19 can be configured to dispense the water in a shower, jets, mist, or also possibly in a continuous flow.

The machine 10 also comprises a heating device 21, disposed between the tank 12 and the filtering container 13, and configured to heat the water in transit to the desired temperature.

According to some embodiments, the heating device 21 is disposed along the hydraulic circuit 22 that connects the tank 12 to the diffusion head 19.

Figure 2:
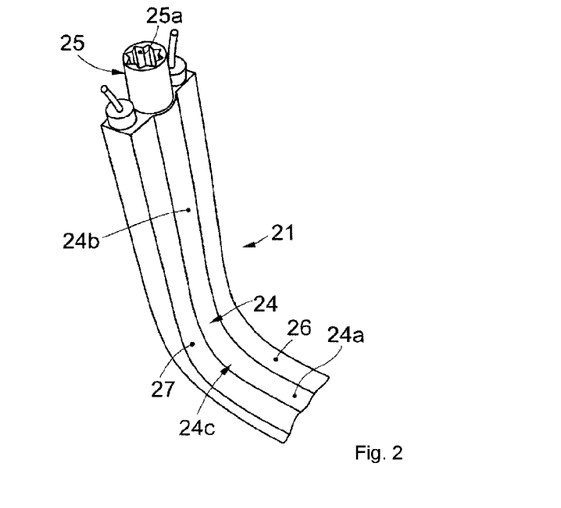
FIG. 2 is a schematic view in detail of a component of the machine for preparing beverages in FIG. 1.

According to some embodiments, the heating device 21 comprises a boiler 24 having at least a conduit 25 defining at least a transit channel 25a for the water to be heated, and at least one heating element 26 associated with the boiler 24 and configured to heat the water inside.

According to some embodiments, the transit channel 25a defines a segment of the circuit 22. According to possible solutions, the internal walls of the transit channel 25a have a suitable shape to extend the useful heat exchange surface.

According to some embodiments, the transit channel 25a is internally lined with a material which does not allow the sedimentation of limescale.

According to other embodiments, the boiler 24 comprises at least one first smaller branch 24a and a second larger branch 24b.

The larger branch 24b is disposed in a vertical direction, so as to reduce thermal losses to a minimum.

The inlet of the boiler 24 in particular is advantageously positioned at a lower height than its output.

According to some embodiments, the boiler 24 can be L-shaped, providing the smaller branch 24a disposed at least partly horizontally.

According to possible embodiments, the boiler 24 comprises an accumulation zone 24c, in which possible water residues present in the boiler 24 can be collected.

The accumulation zone 24c is preferably disposed upstream of the larger vertical branch 24b along the path of the water.

According to some embodiments, the boiler 24 can comprise two vertical branches, located on one side and the other of the accumulation zone 24c.

According to possible variant embodiments, the boiler 24 can be U-shaped or J-shaped.

The U or J shape is particularly advantageous since the water possibly present inside tends to accumulate in the accumulation zone 24c, allowing it to be dried by activating the heating element 26.

When water flows in a vertical segment, in fact, it is in direct contact with all the internal walls of the transit channel 25a, so that the heat exchange surface is maximized.

According to some embodiments, the heating device 21 comprises two or more heating elements 26, 27.

According to other embodiments, the heating elements 26, 27 can be electrical resistances disposed along the longitudinal development of the boiler 24, in a linear manner or in a spiral.

According to a variant, the heating elements 26, 27 can be activated so that they reach the target temperature, or to modulate their temperature.

According to some embodiments, the heating elements 26, 27 are autonomous and independent of one another. In particular, the heating elements 26, 27 can be selectively fed according to the temperature to which the water in transit is to be heated and/or depending on the state of progress of the beverage preparation operation.

According to some embodiments, the heating elements 26, 27 have the same power, that is, each one corresponds to 50% of the overall power of the heating device 21.

According to possible variants, the heating elements 26, 27 have different powers from each other, thus allowing a further modulation of the heating temperature.

For example, according to possible implementations, the heating elements 26, 27 can have proportional powers, for example 60%-40%, 70%-30%, 75%-25%, 80%-20%, or intermediate values.

According to some embodiments, the machine 10 also comprises temperature sensor means 28 disposed along the circuit 22 and configured to detect the temperature of the water in transit.

According to some embodiments, the temperature sensor means 28 are disposed downstream of the boiler 24 so as to detect the temperature of the water in transit near the area in which it comes into contact with the aromatic mixture 11.

According to possible variants, the temperature sensor means 28 can be positioned inside the boiler 24, possibly in correspondence with the exit end of the transit channel 25a.

According to other variants, temperature sensor means 28 can be provided both integrated in the boiler or in the heating device 21, and also disposed downstream thereof and possibly upstream as well, so as to be able to regulate the supply of the one or more heating elements 26, 27 also depending on the difference in water temperature detected upstream and downstream of the heating device 21.

According to possible solutions, the temperature sensor means 28 can comprise a Negative Temperature Coefficient (NTC) resistance, located inside a pipe defining a segment of the circuit 22.

According to some embodiments, the machine 10 comprises a pump 30 disposed along the circuit 22 and configured to draw the water from the tank 12 and feed it through the boiler 24 toward the filtering container 13 or the second outlet 16.

According to some embodiments, the pump 30 can be selectively activated to take on each occasion the quantity of water suitable for preparing the quantity of beverage selected by the user.

According to some embodiments, the pump 30 is of the adjustable flow type, so that it is possible to regulate the speed of the water that passes through the boiler 24 and possibly through the aromatic mixture 11.

According to some embodiments, the machine 10 comprises flow detection means disposed in the tank 12 and/or along the circuit 22 to measure the quantity of water in transit through it.

According to some embodiments, the flow detection means comprise a flowmeter 32.

According to some embodiments, the flowmeter 32 is located upstream of the pump 30, allowing a faster and more efficient detection of the flow rate and therefore a dynamic and real-time regulation of the pump 30.

According to some embodiments, the machine 10 comprises a diversion element 44 disposed along the circuit 22 and configured to selectively divert the flow of water toward the filtering container 13 or toward the diversion channel 23.

The diversion element 44 in particular separates the circuit 22 into two portions 22a, 22b, of which a first portion 22a is disposed upstream of the diversion element 44, defining the shared segment of the circuit 22, and a second portion 22b is disposed downstream thereof.

According to variant embodiments, the diversion element 44 is disposed downstream of the heating device 21 and the temperature sensor means 28.

In this way, if the user selects the preparation of a brewed beverage, the water is made to pass in the filtering container 13 through the aromatic mixture 11, while if the user selects the preparation of hot water only, the heated water is diverted in such a way that it does not pass through the filtering container 13, preventing the risk of possible contamination.

According to other embodiments, the diversion element 44 can assume at least a first state in which it closes the diversion channel 23 and allows the water to transit to the filtering container 13, and a second state in which it closes the circuit 22 toward the filtering container 13 and allows the water to transit through the diversion channel 23.

According to possible solutions, the diversion element 44 can comprise a three-way valve, of which two paths are associated with the circuit 22 respectively as inlet and as first outlet, and one path is associated as second outlet to the diversion channel 23.

According to other embodiments, the diversion element 44 assumes the first or second operating state, depending on the position of the selector device 40.

For example, it can be provided that the first position of the selector device 40 corresponds to the selection of an brewed beverage and determines the first state of the diversion element 44, while the second position corresponds to the selection of hot water only and determines the second state of the diversion element 44.

According to other embodiments, the selector device 40 can be connected to the selective dispensing means 41, 42 associated with the first 14 and the second outlet 16 and can directly or indirectly condition the functioning thereof, in relation to the opening or closing of the first and second outlets 14, 16.

According to some embodiments, it can be provided that, depending on the position of the selector device 40, one of the selective dispensing means 41, 42 closes/opens its outlet 14, 16, while the other of the selective dispensing means 41, 40 opens/closes its outlet 16, 14.

For example, when the selector device 40 is in the first position, the selective dispensing means 41, 42 can be disposed so as to open the first outlet 14 and close the second outlet 16; when the selector device 40 is in the second position, on the contrary, they can close the first outlet 14 and open the second outlet 16.

According to possible variants, the selector device 40 can assume three different positions, with a third position in which the selective dispensing means 40, 41 close both outlets 14, 16 with the respective valves 48, 49.

Closing the valves 48, 49 allows, in particular, to remove the receptacle 15 during the dispensing of the beverage without risk of drips. This is particularly useful when dispensing a brewed beverage. In fact, when dispensing water only, switching off the pump 30 implies stopping the dispensing, while when dispensing an brewed beverage, the dispensing continues for a certain period of time after the pump 30 has been switched off, because of the delay due to the transit of the water through the aromatic mixture 11.

According to possible solutions, the machine 10 can be provided with presence detection means, not shown, configured to detect the presence of a receptacle 15 in correspondence with one or the other outlet 14, 16. The presence detection means can be connected to the selective dispensing means 41, 42, so as to regulate their functioning.

According to some embodiments, the selector device 40 can be a mechanical device, such as a lever, a sliding bar, or similar element, which can be manually moved by the user.

According to these embodiments, the selector device 40 can directly drive the selective dispensing means 41, 42.

According to variant embodiments, the selector device 40 can be an electrical or electronic command, which can be activated by the user or according to a functioning program.

According to some embodiments, the selector device 40 is subjected to a functioning program executed by a control and command unit 34.

In this case, the selector device 40 can indirectly drive the selective dispensing means 41, 42.

According to other embodiments, position sensor means 45, 46 can be provided, configured to detect the position of the selector device 40.

According to some embodiments, the position sensor means 45, 46 can comprise one or more of either optical sensors, proximity sensors, or other similar or comparable elements, possibly cooperating with mating elements associated with the selector device 40.

According to some embodiments, the machine 10 comprises a control and command unit 34, configured to regulate the operation of the machine 10 according to the user's selection, to prepare on each occasion the selected beverage.

According to some embodiments, the control and command unit 34 can comprise, or be connected to, a memory unit 33, in which information can be memorized relating to the operating parameters for the preparation of each selectable beverage.

Figure 5:
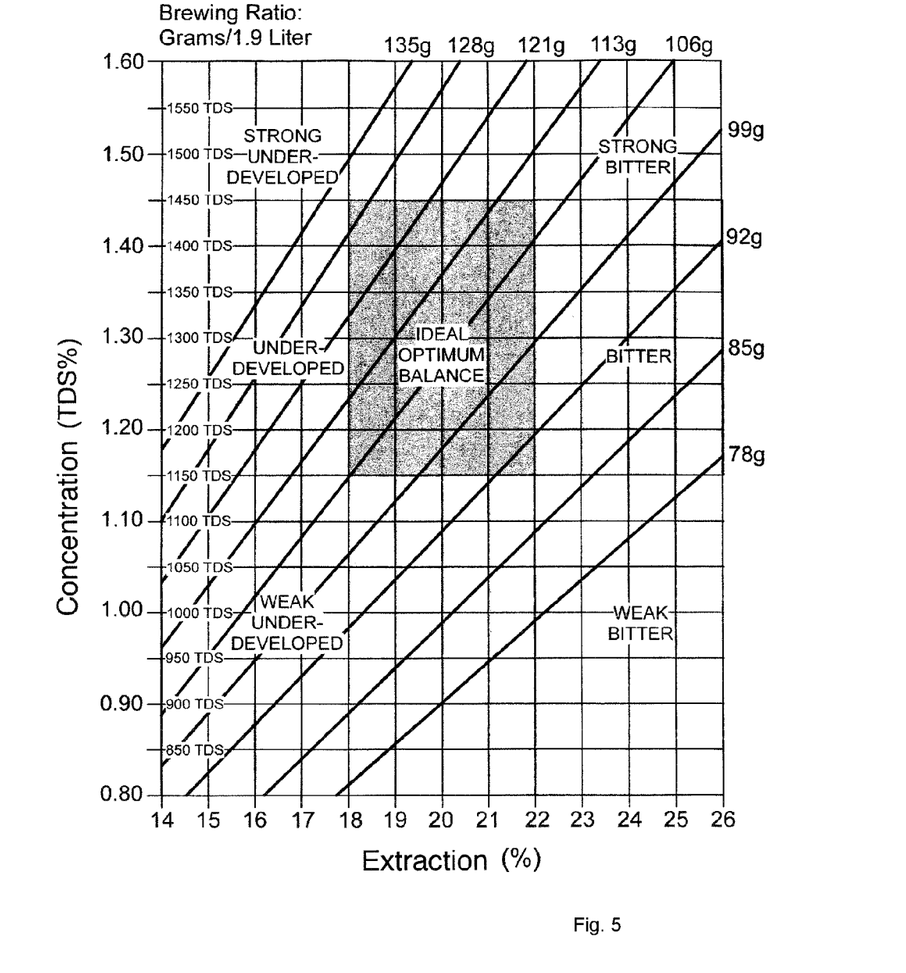
FIG. 5 is a graph showing the concentration, or the percentage of dissolved solids (TDS) in the brewed beverage as a function of the percentage of extraction of the substances from the aromatic mixture.

According to some embodiments, the percentage of total dissolved solids (TDS) and optimal extraction percentages can be memorized in the memory unit 33 for each selectable brewed beverage, for example, defined on the basis of a graph of the type shown in FIG. 5. The graph shows the optimal percentages fot different concentrations of coffee according to the standard parameters defined by Special Coffee Association (SCA).

The term "percentages of TDS" means the quantity of substances present in the brewed beverage with respect to the quantity of water that makes up the beverage itself.

The term "extraction percentages" means the quantity of substances that have been extracted from the aromatic mixture 11 used, in the present example from the coffee powder, with respect to the quantity of aromatic mixture 11 used.

For example, for a coffee-based brewed beverage with a "normal" or "ideal" concentration, the extraction percentage can be comprised between 18% and 22%, while the percentage of TDS can be comprised between 1.15% and 1.45%. Fora "light", or "weak" concentration, the percentage of TDS can be comprised between 0.8% and 1.30%, preferably between 1% and 1.20%, while for a "strong" concentration the percentage of TDS can be comprised between 1.30% and 1.50%, preferably between 1.40% and 1.50%. An additional "ultra-strong" concentration can also be provided, where the percentage of TDS can be greater than 1.50%.

Moreover, given the same quantity of brewed beverage to be prepared, specific information regarding optimal water temperature for each light, normal, strong, or possibly ultra-strong concentration, or other, can be memorized.

According to variant embodiments, the information can comprise the optimum values of water temperature and/or speed for each beverage selectable by the user, that is, for each combination defined by type of beverage, quantity, concentration, temperature, etc.

According to variant embodiments, the memorized information comprises, for each selectable beverage, a range of duty-cycle values for activating the heating device 21 and/or a range of values of the flow rates of the water, suitable to guarantee both that the water is heated to the optimal temperature, and also the specific TDS percentages for each beverage.

The regulation of the temperature makes it possible to prepare, in addition to coffee, beverages based on tea or other vegetable substances, which generally require lower infusion temperatures than those required for coffee.

By way of example, while for a coffee beverage a water temperature preferably comprised between about 92° C. and about 96° C. is required, to prepare tea a water temperature comprised between about 70° C. and about 90° C. is preferable, depending on the quality of the tea used, or other substance to be infused.

According to some embodiments, the control and command unit 34 can be connected to the position sensors 45, 46 to receive an indication of the position of the selector device 40.

According to some embodiments, the control and command unit 34 is connected to the diversion element 44 and is configured to modify the state of the latter according to the indication received from the position sensors 45, 46.

According to possible variant embodiments, it can be provided that the control and command unit 34 can modify the state of the diversion element 44 even during the preparation of the beverage, so as to dilute the brewed beverage and, for example, prepare an "ultra-light" beverage, for example having TDS <1%. In this case, during the delivery of the brewed beverage, the control and command unit 34 can keep both outlets 14, 16 open, acting on the respective selective dispensing means 41, 42, and alternately modify the status of the diversion element 44 so as to deliver a portion of the water in the filtering container 13, and to dispense a portion of the water directly into the receptacle 15 without making it transit through the aromatic mixture 11, possibly exploiting the time needed for the water in the filter container 13 to pass through the aromatic mixture 11.

According to other embodiments, the control and command unit 34 can act on the selective dispensing means 41, 42 to close and open the respective outlets 14, 16.

According to variant embodiments, the control and command unit 34 can act on the selector device 40 on the basis of a functioning program provided for the specific selected beverage to command the operation of the selective dispensing means 41, 42.

Providing an automated activation/deactivation of the selective dispensing means 41, 42 also allows to fill the filtering container 13 with the desired quantity of water and to keep the first outlet 14 closed for a certain time before dispensing the beverage into the receptacle 15 This allows to prepare a beverage with the desired degree of infusion, for example, to prepare even a cold-brewed beverage, commonly referred to as cold-brew, which requires high cold infusion times of the aromatic mixture 11, even hours, or to prepare a tea, or a herbal tea, by hot infusion of the aromatic mixture 11 generally for some minutes.

According to a variant, means are provided which determine, depending on the organoleptic characteristics required for the type of beverage, the closing time of the valve 48 associated with the infusion.

According to other embodiments, depending on the position of the selector device 40, the control and command unit 34 can also enable and/or disenable one or more commands of the user interface 35.

In this way, depending on the selection of brewed beverage or hot water, the user can select additional characteristics of the beverage to be prepared.

According to some embodiments, if the brewed beverage is selected, the control and command unit 34 can enable commands of the user interface 35 suitable to select quantity 51, concentration 52, and/or temperature 53.

According to some embodiments, if the brewed beverage is selected, the control and command unit 34 can also enable a command for the function of dispensing the brewed beverage on ice 54.

According to some embodiments, if the function of dispensing the beverage on the ice 54 is selected, the control and command unit 34 enables, or maintains enabled, the concentration selection commands 52 so that the user can select the desired concentration of the beverage to be dispensed on ice.

According to other embodiments, if the brewed beverage is selected, the control and command unit 34 can also enable a command for the function of preparing the cold brewed beverage, or cold-brew 55.

In this case, when the command for the "cold-brew" function 55 is selected, the control and command unit 34 can activate the pump 30 to fill the filtering container 13 with the desired quantity of water, and then leave the aromatic mixture 11 in infusion for the necessary time, for example according to a functioning program memorized in the memory unit 33, before activating the first selective dispensing means 41 and opening the outlet for the brewed beverage 14 to dispense the beverage into the receptacle 15.

According to other embodiments, if the brewed beverage is selected, the control and command unit 34 can also enable a command for the function of preparing a brewed beverage with intermittent delivery, generally referred to as a "pour-over" 56.

According to possible variants, if hot water is selected, the control and command unit 34 can enable commands of the user interface 35 to select quantity 51 and/or temperature 53, and disenable those for the selection of the concentration 52, or for the possible special infusion functions 54, 55, 56.

According to other variations, it can be provided that the commands to select quantity 51 are active for each type of beverage.

According to other variations, it can be provided that the commands to select temperature 52 are active for each type of beverage.

According to some embodiments, the control and command unit 34 is also connected to the temperature sensor means 28 and to the flowmeter 32 to receive the data detected by them.

The control and command unit 34 is also configured to compare the data received with the values memorized in the memory unit 33.

Depending on the selection made by the user on the type of beverage to be prepared and/or characteristics selected, and on the basis of the data received from the temperature sensor means 28 and the flowmeter 32, the control and command unit 34 can regulate the flow rate of the pump 30 and/or the switching on/off of the heating device 21 to obtain the beverage selected.

According to some embodiments, the control and command unit 34 receives in real time the data relating to the flow rate and temperature of the water and dynamically regulates, with a feedback control, the pump 30 and the heating device 21 in such a way that the water is heated at the optimum temperature defined for the selected beverage.

According to a variant, the control and command unit can regulate the flow rate of the pump and activate the heating device 21 by means of a PID type regulation system, or by other suitable means.

According to these embodiments, for example, the PID regulation system can receive as inlets the flow rate of the water detected by the flowmeter 32 and the temperature of the water detected by the temperature sensor means 38 and supply as outlets the flow rate of the pump 30 and the power supply of the heating element 26, 27 of the heating device 21.

According to some embodiments, the control and command unit 34 regulate the operation of the pump 30 and the heating device 21 in order to consequently modify the temperature and the flow rate of the water passing through the aromatic mixture so as to modify the taste and the intensity of the beverage according to the selection made by the user.

In particular, given the same temperature of the heated water, the control and command unit 34 can decrease or increase the flow rate of the pump 30, and hence the water speed, respectively, to extract more or fewer substances from the aromatic mixture 11, and thus regulate the intensity of the beverage.

For example, it can be provided that the control and command unit 34, to modify the flow rate, acts on the feed power of the pump 30, in such a way as to increase or decrease the number of revs of the motor of the pump.

According to other embodiments, the pump 30 can be selectively activated/deactivated to deliver the water in pulses, so as to perform a "pour-over" infusion, that is, to obtain a particularly slow extraction of the substances from the aromatic mixture 11.

According to other embodiments, the control and command unit 34 can selectively switch on and off the at least one heating element 26, 27 according to a certain duty-cycle, so as to keep it at the suitable temperature.

For example, in order to prepare a jug of coffee beverage with a "light" concentration, the control and command unit 34 can regulate the pump 30 to maintain a flow rate comprised between 0.28 and 0.32 dm3/min and switch on/off the one or more heating elements 26, 27 with a duty cycle comprised between 55% and 65%. In another example, to prepare a jug of coffee beverage with a "normal" concentration, the control and command unit 34 can regulate the pump 30 to maintain a flow rate comprised between 0.23 and 0.28 dm3/min and switch on/off the one or more heating elements 26, 27 with a duty cycle comprised between 65% and 75%. According to another example, in order to prepare a jug of coffee beverage with a "strong" concentration, the control and command unit 34 can regulate the pump 30 to maintain a flow rate comprised between 0.19 and 0.23 dm3/min and switch on/off the one or more heating elements 26, 27 with a duty cycle comprised between 75% and 85%. In yet another example, in order to prepare a jug of coffee beverage with an "ultra-strong" concentration, the control and command unit 34 can regulate the pump 30 to maintain a flow rate comprised between 0.17 and 0.19 dm3/min and switch on/off the one or more heating elements 26, 27 with a duty cycle comprised between 85% and 95%.

It is understood that the optimal values of flow rate and duty-cycle can be suitably modified depending on the characteristics of the pump 30 and heating device 21 utilized.

According to other embodiments, the control and command unit 34 autonomously and independently switches on and off each heating element 26, 27, so as to suitably modulate the temperature of the heating device 21 according to the operations to be performed.

For example, the temperature of the heating device 21 can be modulated on the basis of slow preheating operations, temperature maintenance, high temperature delivery, or other.

The possibility of dynamically modifying both the flow rate of the pump 30 and also the temperature of the heating device 21, and hence of the water, allows to optimize the extraction of the substances of the aromatic mixture 11 to obtain the desired intensity of the beverage as selected by the user, without needing a pre-infusion step, thus meeting the requirements for high quality.

According to possible variants, however, it can be provided to perform a pre-infusion step of the aromatic mixture 11 before dispensing the brewed beverage.

In this case, it can be provided to keep the first outlet 14 closed with the first selective dispensing means 41 for a suitable time for performing pre-infusion.

According to other embodiments, the housing 20 is provided with a support base 37 for the receptacle 15.

According to possible variants, the support base 37 can be provided with additional heating means 38 selectively activated by the control and command unit 34 to keep the beverage dispensed in the receptacle 15 hot.

For example, the additional heating means 38 can comprise a Positive Coefficient Temperature (PCT) resistance.

According to possible embodiments, not shown, other support bases can be provided, possibly folding or mobile, configured to bring a smaller receptacle 15 closer to the outlet of the beverage 14 so as to prevent any splashes of beverage, for example if the receptacle 15 used is a cup, or a glass.

Embodiments described here concern a method for preparing a beverage as a function of a selection made by a user.

Figure 4:
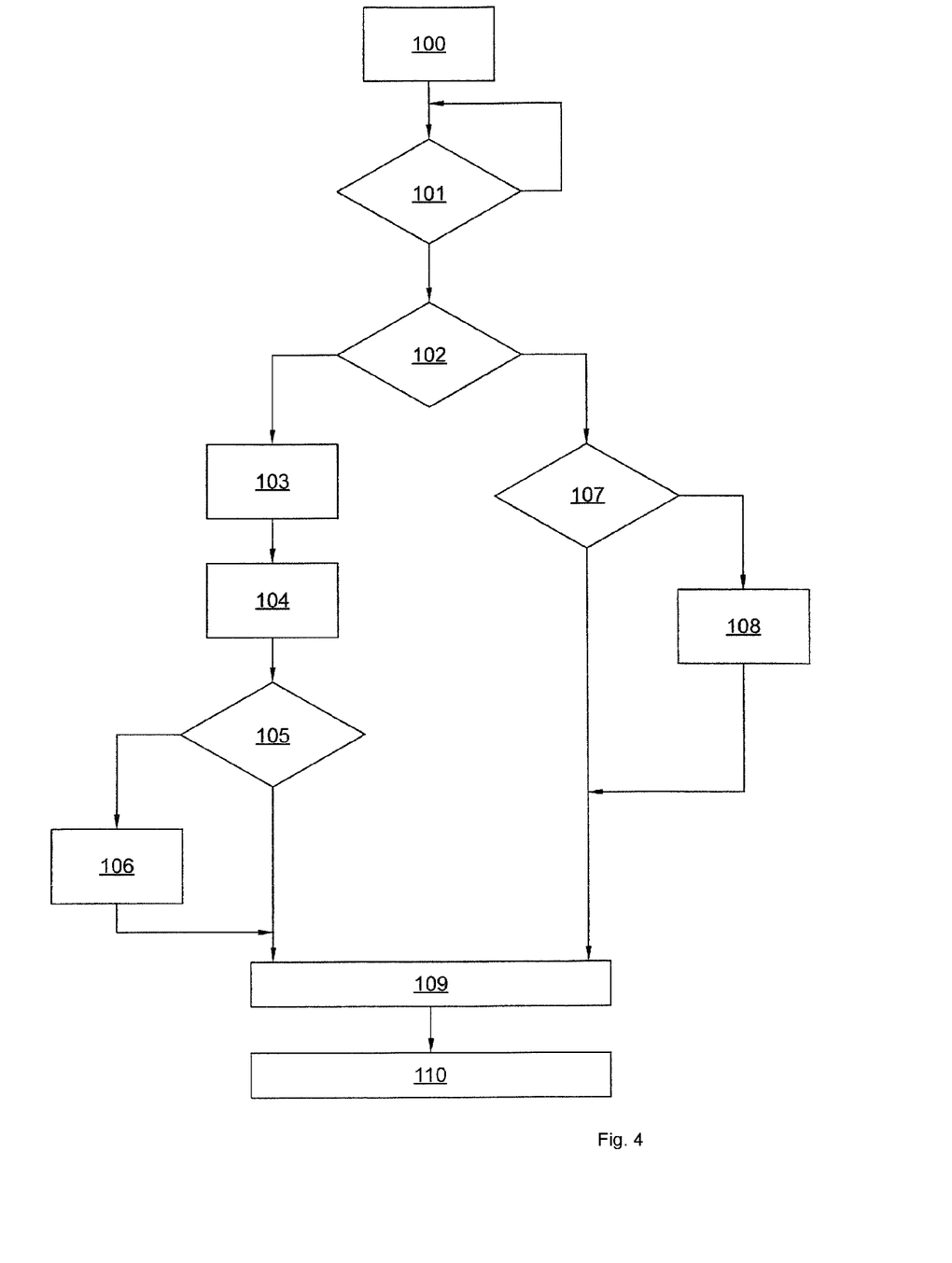
FIG. 4 shows a block diagram of a method for preparing a beverage according to embodiments described here.

According to embodiments described by way of example with reference to the block diagram in FIG. 4, the method according to the invention provides:
- to start the machine (block 100);
- to verify if a command has been received regarding the type of beverage to be prepared (block 101) and possible stand-by;
- to insert in a user interface 35 associated with a control and command unit 34 the selection of a type of beverage to be prepared by infusion, or hot water (block 102);
- based on the type of beverage selected by the user, to enable or disenable a plurality of commands of the user interface 35 (blocks 103, 104, 107, 108), in order to respectively allow or prevent the selection of other characteristics by the user of the beverage to be prepared;
- to receive other characteristics selected by the user as a function of the type of beverage selected (blocks 105-108) and/or the quantity of beverage, and/or the size of thee receptacle 15;
- to condition the various functioning factors in relation to the specific characteristics of the specific beverage selected and the operating parameters provided for said beverage selected (block 109);
- to deliver the water according to the operating parameters provided for the specific beverage with the specific organoleptic characteristics selected (block 110).

The characteristics of the beverage can comprise, for example, organoleptic characteristics such as the concentration of dissolved solid substances, temperature, time or type of infusion, quantity of beverage, taste and/or intensity of the beverage, or other.

According to some embodiments, the verification of the command of the beverage type selected comprises detecting the position of the selector element 40 by means of the position sensors 45, 46.

According to some embodiments, depending on the type of beverage selected, the method provides to determine the state of the diversion element 44 to selectively and fluidly connect the tank 12 to the first outlet 14 for the brewed beverage, or to the second outlet 16.

According to other embodiments, the control and command unit 34, depending on the type of beverage selected, disenables the commands of the user interface 35 that are not correlated to that selection, or enables the commands correlated with the type of beverage selected, so as to simplify the use of the machine 10 for the user.

According to some embodiments, if the user has selected the preparation of a brewed beverage in block 102, the method provides to maintain enabled at least the commands for selecting the concentration of the brewed beverage 53 (block 103).

According to other embodiments, if the user has selected the preparation of an brewed beverage in block 102, the method provides to maintain enabled at least the commands for selecting special infusion functions 54-56 (block 104) and/or for selecting the concentration 53.

According to other embodiments, if the user has selected a brewed beverage, the verification of the characteristics selected by the user provides to verify whether the user has selected a concentration for the brewed beverage (block 105), or has selected a function of dispensing on ice, depending on the commands 53, 54 driven.

According to these embodiments, if the function of dispensing on ice has been selected, the method provides to enable and/or to keep active the commands to select the concentration 52 and to wait for another selection of the concentration by the user before proceeding with the preparation of the beverage.

According to other embodiments, if hot water is selected in block 102, the verification of the characteristics selected by the user provides to verify whether the water heating temperature is that desired by the user (block 107).

If so, the method provides to prepare the beverage, while if not the method provides to maintain the temperature selection commands 52 enabled to allow the user to select the desired value (block 108).

According to some embodiments, the method comprises a verification of the quantity of beverage selected by the user (block 109), which can be carried out at any time between the start of the machine 10 and the dispensing of the beverage (block 110).

According to variant embodiments, the conditioning step of the various functioning factors comprises determining the specific temperature parameters for the selected beverage.

For example, determining the specific parameters can be obtained by comparing the received commands relating to the type and characteristics of the selected beverage with the data memorized in the memory unit 33.

According to other embodiments, the conditioning step of the various functioning factors comprises determining the values of the flow rate of the pump 30 and the activation cycle of the heating device 21 suitable to obtain the specific temperature parameters.

According to some embodiments, the functioning factors can be managed so as to guarantee to prepare and dispense the brewed beverage within 4-8 minutes, so as to meet the requirements of high quality independently from quantity and concentration of the selected brewed beverage.

According to some embodiments, determining the values of the flow rate and the activation cycle can be obtained by comparing the received commands relating to the type and characteristics of the selected beverage with the data memorized in the memory unit 33 and/or the data received from the flowmeter 32 and the temperature sensor means 28.

According to other embodiments, at the start of the preparation, the method provides to initially activate the pump 30 until the boiler 24 is filled with the water to be heated, reaching the temperature sensor means 28 and subsequently to activate the element heating 26, 27 until the water inside the boiler 24 reaches a temperature coherent with the beverage selected.

According to some embodiments, when the temperature sensor means 28 detect a temperature of the heated water corresponding to the specific temperature, the control and command unit 34 again starts the pump 30 to dispense the amount of water corresponding to the selection made.

According to other embodiments, at the end of the dispensing of the beverage, the method provides to restore the initial conditions of the machine, so as to guarantee, on each occasion, for each beverage selected, both to heat the water to the correct and specific temperature, and also to provide the defined quantity thereof.

According to other embodiments, at the end of the dispensing of the beverage, the method provides to deactivate the pump 30, leaving the heating device 21 active for a certain time so as to empty the circuit 22 by means of a convective motion, and possibly to dry the water remaining inside it.

In this way, possible residual water is prevented from remaining in the circuit and distorting the measurement of the quantity of water dispensed in a subsequent beverage dispensing operation.

According to possible variant embodiments, if a user selects the function of dispensing on ice 54, the control and command unit 34 regulates the pump 30 and the heating device 21 so that, once dispensed in a receptacle filled with ice, its concentration and volume correspond to the selection made by the user.

In particular, the control and command unit 34 can regulate the operating parameters of the pump 30 and the heating device 21 in order to prepare a brewed beverage with a concentration higher than the concentration selected so as to compensate the dilution due to the ice in the receptacle 15.

For example, if a jug of beverage on ice with a "normal" concentration is selected, the control and command unit 34 commands the components to prepare a lower quantity of brewed beverage, for example half a jug, with a higher concentration, for example "strong", so as to compensate for the dilution of the beverage due to the ice and, at the same time, not to dispense volumes greater than the capacity of the receptacle 15 selected.

According to possible variants, if hot water is selected, the method according to the invention provides to enable the commands to select the temperature 52 for each type of beverage selected.

According to other embodiments, the method according to the invention provides to enable the commands to select the temperature 52 for each type of beverage selected.

According to other embodiments, it can be provided that the user can enter the desired temperature value independently, or can choose from a plurality of pre-set values.

It is clear that modifications and/or additions of parts can be made to the machine 10 and the method for preparing a beverage as described heretofore, without departing from the field and scope of the present invention.

It is also clear that, although the present invention has been described with reference to some specific examples, a person of skill in the art shall certainly be able to achieve many other equivalent forms of machine 10 and method for preparing a beverage, having the characteristics as set forth in the claims and hence all coming within the field of protection defined thereby.

The invention claimed is:

1. A machine for preparing beverages comprising a tank for the water, fluidly associated, by means of a circuit, with a filtering container suitable to contain an aromatic mixture to be subjected to infusion, comprising, located in cooperation along said circuit, a flowmeter configured to measure the flow rate of the water in said circuit, a pump with an adjustable flow rate to feed the water into said circuit, a heating device for the water with an adjustable temperature, and temperature sensor means suitable to measure the temperature of the water downstream of said heating device, wherein said machine also comprises a selector device drivable by a user to select a type of beverage selected between a brewed beverage or only hot water and a user interface provided with suitable commands by means of which the user can select the characteristics of the beverage to be prepared and a control and command unit functionally connected to said user interface and configured to disenable the commands of said user interface not connectable to the type of beverage selected, or enable the commands correlated to said type of beverage selected, in order to allow and simplify the selection by the user of further specific organoleptic characteristics for said type of beverage selected, determine the state of a diversion element to selectively and fluidly connect the tank) to a first outlet for the brewed beverage, or to a second outlet for hot water depending on the type of beverage selected and to receive the data detected by said flow meter and by said temperature sensor means and to command the functioning of said pump and of said heating device in order to regulate the temperature and the flow rate of the water in said circuit as a function of the type and the organoleptic characteristics of the selected beverage.

2. The machine as in claim 1, comprising a first outlet for the brewed beverage, cooperating with said filtering container, and a second outlet for the hot water, cooperating with a diversion channel separated from said filtering container, and a selector device which can be driven to enable said first or said second outlet, wherein said first outlet and said second outlet are selectively and alternatively put in fluidic communication with said tank by a diversion element disposed downstream of said heating device along a first common portion of said circuit.

3. The machine as in claim 2, wherein said selector device and said diversion element are reciprocally governed in a selective manner.

4. The machine as in claim 2, wherein said selector device is automatized and is governed by a functioning program executed by said control and command unit.

5. The machine as in claim 1, wherein said heating device comprises a boiler comprising at least a first smaller branch and a second larger branch connected one to the other and disposed in sequence along the path of the water, wherein the larger branch is disposed in a vertical direction.

6. The machine as in claim 5, wherein said boiler comprises an accumulation zone for the water, disposed upstream of said larger branch along the path of the water.

7. The machine as in 1, wherein said heating device comprises at least a heating element associated with said boiler, wherein said heating element can be activated by said control and command unit so that it reaches the target temperature, or in a modulatable manner.

8. The machine as in claim 7, wherein said heating device comprises at least two heating elements independent and with differentiated powers.

9. The machine as in claim 1, including means that determine and control the infusion time.

10. A method to prepare a beverage in a machine for preparing beverages, comprising:
receiving through a user interface associated with a control and command unit the selection of a type of beverage to be prepared selected between a beverage obtained by infusion, or only hot water;
based on the type of beverage selected by the user, disenabling the commands of said user interface not connectable to the type of beverage selected, or enabling the commands correlated to said type of beverage selected, in order to allow and simplify the selection by the user of further specific organoleptic characteristics for said type of beverage selected, wherein if a beverage obtained by infusion is selected, the control and command unit enables commands of the user interface suitable to select quantity, concentration, and/or temperature or commands for special infusion functions, and if hot water is selected, the control and command unit enables commands of the user interface to select quantity and/or temperature, and disenables those for the selection of the concentration, or for the possible special infusion functions;
receiving and verifying the characteristics selected by the user as a function of the type of beverage selected by said command, comprising at least one of either quantity, temperature, concentration, and/or particular functions of infusion;
conditioning the various functioning factors of said machine in relation to said specific selected characteristics and the operating parameters provided for said beverage selected;
depending on the type of beverage selected, determining the state of a diversion element disposed along a circuit for the water to selectively and fluidly connect a tank to a first outlet for the brewed beverage, or to a second outlet for hot water; and
regulating the operation of a pump and of a heating device to regulate the temperature and the flow rate of the water to be delivered according to the operating parameters provided for obtaining a selected beverage with said specific organoleptic characteristics selected.

11. The method as in claim 10, wherein, before the conditioning of the functioning factors, a verification of the characteristics selected by the user is provided, checking whether the user has selected a specific concentration for the brewed beverage, or if he/she has selected a dispensing function on ice, wherein, if the dispensing function on ice has been selected, said method provides to receive a further selection of a concentration by the user before starting the preparation of said beverage.

12. The method as in claim 11, wherein if the dispensing function on ice has been selected, said method provides to regulate the functioning of the pump and of the heating device to regulate both the temperature and the flow rate of the water, in order to prepare a brewed beverage with a greater concentration and with a smaller quantity than that selected, so as to obtain, in a receptacle filled with ice and with a capacity equal to that selected, the percentages of solids dissolved and extraction corresponding to the concentration selected by the user.

13. The method as in claim 10, wherein in order to prepare a brewed beverage with a greater or respectively smaller concentration, given the same heating temperature of said heating device, said method provides to decrease, or respectively increase, the flow rate of said pump.

14. The method as in claim 10, wherein in order to prepare a brewed beverage with a greater or respectively smaller concentration, given the same flow rate of said pump, said method provides to increase, or respectively decrease, the heating temperature of said heating device.

15. The method as in claim 10, wherein, if delivery of hot water is selected, the verification of the characteristics selected by the user provides to verify the heating temperature of the water, and possibly to wait for a command to confirm or modify said temperature by the user.

16. The method as in claim 10, wherein the conditioning of the various functioning factors comprises the determination of the values of the flow rate of said pump and of the activation cycle of said heating device, said values being obtained by comparing the commands received relating to the type and characteristics of the beverage selected with data memorized in a memory unit connected to said control and command unit and/or with data received from a flow meter and from temperature sensor means.

17. The method as in claim 10, wherein the particular functions of infusion selectable by the user comprise at least one between dispensing a brewed beverage on ice, preparing a cold brewed beverage, or preparing a brewed beverage "pour over" with intermittent delivery.

18. The method as in claim 17, wherein if a cold-brew beverage has been selected, it provides to activate said pump to fill a filtering container where there is an aromatic mixture to be subjected to infusion with the desired quantity of water, keeping closed an outlet for the brewed beverage associated to said filtering container by means of first selective dispensing means to keep in infusion said aromatic mixture for a determined time and then activate said first selective dispensing means to opening said outlet for the brewed beverage and dispense the beverage into a receptacle.

19. The method as in claim 17, wherein, if a "pour over" brewed beverage has been selected, it provides to activate/deactivate selectively said pump to deliver the water in pulses on an aromatic mixture in a filtering container.

20. The method as in claim 10, wherein, if a "ultra-light" brewed beverage has been selected, it provides to modify alternatively the state of a diversion element to connect fluidly and selectively a tank o a first outlet for the brewed beverage associated to a filtering container in which an aromatic mixture is contained, and to a second outlet for the hot water associated to a diversion channel separated from the filtering container, during the preparation of the brewed beverage, to deliver a portion of the water in the filtering container, and to dispense a portion of the water directly into the receptacle without making it transit through the aromatic mixture, possibly exploiting the time needed for the water in the filter container to pass through said aromatic mixture so as to dilute said brewed beverage prepared.

\* \* \* \* \*